March 17, 1964  J. P. CARRINGTON  3,125,341
STATIONARY BICYCLE ATTACHMENT FOR PHYSICAL CONDITIONING
Filed Feb. 8, 1963
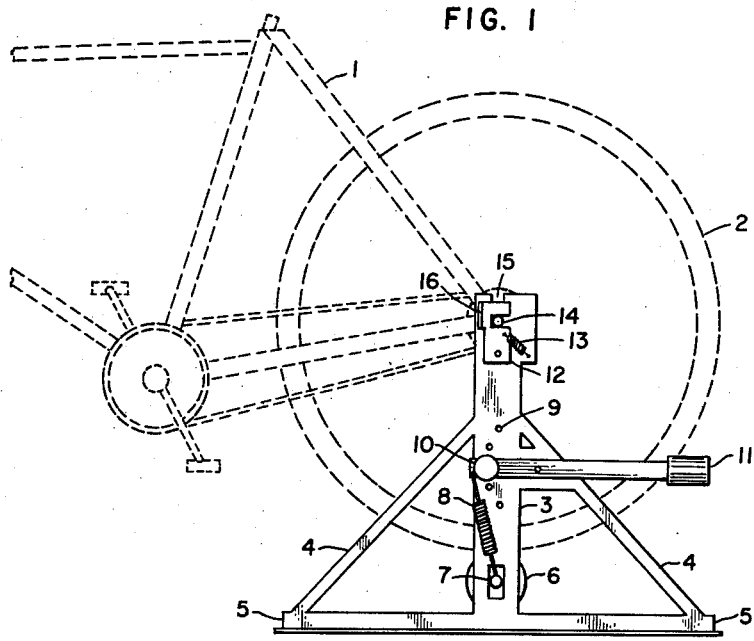
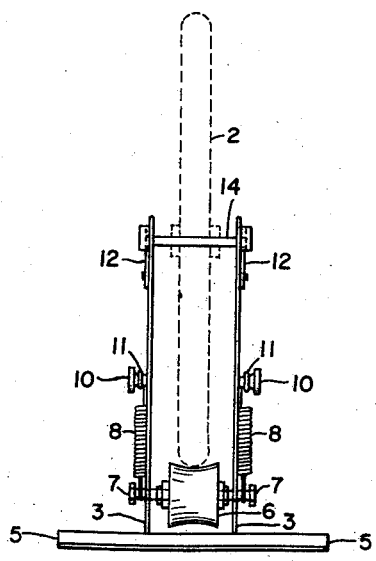
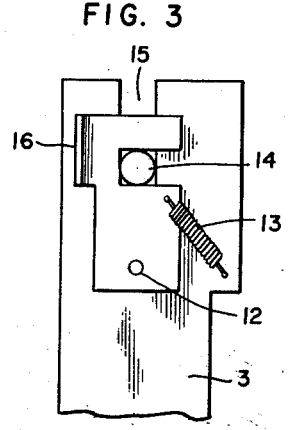
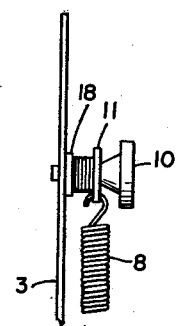
INVENTOR
Jason Prentice Carrington United States Patent Office 3,125,341
Patented Mar. 17, 1964

3,125,341
STATIONARY BICYCLE ATTACHMENT FOR
PHYSICAL CONDITIONING
Jason Prentice Carrington, R.F.D. 1, Hornell, N.Y.
Filed Feb. 8, 1963, Ser. No. 257,334
1 Claim. (Cl. 272—73)

This invention relates to a mechanical device, which, when used in connection with a standard bicycle, said bicycle is able to be utilized as a stationary exerciser.

The device is operated when the rear wheel of a standard size bicycle is positioned in between two supports, and the rear axle is anchored securely by two locking devices. After making a tentative adjustment of the roller pressure by means of positioning the adjustment pins in the desired holes, the bicycle is then mounted and pedaled in the usual manner. If the rider desires more pressure for more difficult pedaling, the adjustment pins are raised to a higher hole. If less pressure for easier pedaling is desired, the adjustment pins are moved to the next lower holes.

New features of this invention over the old include a more rigid overall structure which is much essential due to the necessary movement involved, the principle of fast and sure anchorment of the wheel's axle to the supporting structure, and rapid roller pressure adjustment without the necessity of adjustment tools.

In reference to the accompanying drawings, FIGURE 1 portrays in a side view the invention as connected to a standard bicycle, with the framework of the bicycle in dotted outline. FIGURE 2 illustrates the invention in a rear view showing in dotted outline the bicycle wheel in the correct operating position. FIGURE 3 is a top section enlargement of the invention as shown in FIGURES 1 and 2 showing more clearly the axle locking device. FIGURE 4 is a center section enlargement of FIGURES 1 and 2 showing more clearly the construction of the adjustment pin and knob.

The invention consists of a base 5 the likes of which are constructed from some suitable material which is joined firmly together in such a manner as to form a rigid and stable platform, the form illustrated consisting of two parallel pieces of angle iron which are welded to two opposing pieces of the same material and braced through the center, whereon are attached two supports 3 which are slotted at the top. A standard size bicycle 1 is then positioned in such a manner that the rear wheel 2 is placed in between the tall supports 3 and the axle 14 is maneuvered into the slots 15 with the tire resting on the pressure roller 6. The axle 14 is then anchored firmly in place through the use of two spring-controlled locking devices 12 which are quickly opened and easily closed by springs 13 and the aid of small projections 16 which are utilized as leverage points.

Contact with the bicycle tire 2 is made by the pressure roller 6 with the adjustment handles 11 up and the adjustment pins 10 spring-snapped into the bottom holes 9. The rider then tests for desired degree of pedaling ease or difficulty. If more stiffness of pedaling is desired, the spring-loaded pins 10 are once more released into a new adjustment hole 9. It will now be quite evident that the raising and lowering of the adjustment handles increase or decrease the amount of friction caused by the roller being firmly pressed against the tire.

I claim:

An exercising device to be used in connection with a bicycle, consisting of a base, with supports having slots in the tops to accommodate a bicycle's rear axle, said bicycle axle being firmly anchored by means of spring-adjusted locking devices consisting of units pivoting on the supports having slots in their sides which slip over the bicycle axle and are thus held firmly by springs of which one of the ends are fastened to said units and the other to said supports, with braces reinforcing the overall structure, said supports having slots in the sides wherein is positioned an axle with a roller turning on bearings properly adjusted by cones and locking studs on said axle, with said roller's pressure varied by means of springs of which one of the ends is secured to said roller axle and the other to handles pivotally fastened to said supports, each of said supports having a series of adjustment holes arranged in an arc having the handle pivot as the center, said handles having slideably mounted spring-loaded knobs each carrying a pin, said knobs upon being pulled outward freeing the pins from said adjustment holes, the adjustment of said handles which raises or lowers the roller in the slots against the bicycle tire causing the desired amount of pressure.

References Cited in the file of this patent
UNITED STATES PATENTS

| | | |
|---|---|---|
| 1,621,120 | Lee | Mar. 15, 1927 |
| 2,972,478 | Raines | Feb. 21, 1961 |

OTHER REFERENCES

Popular Mechanics, vol. 17, No. 1, January 1962, pages 155, 156.